United States Patent [19]
Gebauer et al.

[11] Patent Number: 5,192,198
[45] Date of Patent: Mar. 9, 1993

[54] DIAPHRAGM PUMP CONSTRUCTION

[75] Inventors: Gerhard Gebauer, Bermatingen; Wilfried Goes, Meersburg; Otto Rosenauer, Langenargen, all of Fed. Rep. of Germany

[73] Assignee: J. Wagner GmbH, Fed. Rep. of Germany

[21] Appl. No.: 573,626

[22] Filed: Aug. 27, 1990

[30] Foreign Application Priority Data

Aug. 31, 1989 [DE] Fed. Rep. of Germany ....... 3928949

[51] Int. Cl.$^5$ .............................................. F04B 9/08
[52] U.S. Cl. .................... 417/383; 417/446; 417/305; 92/98 R; 92/99
[58] Field of Search ............... 417/383, 385, 388, 395, 417/446, 305; 92/98 R, 99

[56] References Cited

U.S. PATENT DOCUMENTS

| | | | |
|---|---|---|---|
| Re. 29,055 | 11/1976 | Wagner | 417/388 |
| 865,151 | 9/1907 | Andrew | 417/446 |
| 2,578,746 | 12/1951 | Scherger | 417/383 |
| 2,902,936 | 9/1959 | Bradley | 417/383 |
| 3,086,550 | 4/1963 | Cummings | 92/98 R |
| 3,254,845 | 6/1966 | Schlosser | 239/332 |
| 3,351,088 | 11/1967 | Jensen | 92/98 R |
| 3,367,270 | 2/1968 | Schlosser | 103/44 |
| 3,612,727 | 10/1971 | Drake | 417/388 |
| 3,623,661 | 11/1971 | Wagner | 239/127 |
| 3,936,245 | 2/1976 | Hilgert | 417/550 |
| 4,403,924 | 9/1983 | Gebauer et al. | 417/388 |
| 4,416,588 | 11/1983 | Karliner | 417/199 |
| 4,573,885 | 3/1986 | Peterson | 417/383 |
| 4,785,719 | 11/1988 | Bachschmid et al. | 92/95 |
| 4,828,464 | 5/1989 | Maier et al. | 417/388 |
| 4,960,038 | 10/1990 | Chiba et al. | 92/98 R |

FOREIGN PATENT DOCUMENTS

| | | |
|---|---|---|
| 1503390 | 1/1970 | Fed. Rep. of Germany . |
| 3018687C2 | 12/1981 | Fed. Rep. of Germany . |
| 3027314A1 | 2/1982 | Fed. Rep. of Germany . |

OTHER PUBLICATIONS

Wagner Gold Power 2500 brochure and Owner's Manual.

Primary Examiner—Richard A. Bertsch
Assistant Examiner—Peter Korytnyk
Attorney, Agent, or Firm—Hill, Steadman & Simpson

[57] ABSTRACT

A diaphragm pump with a flat diaphragm which is held between the face surface of a pump head and the corresponding face surface of a hydraulic block is improved in that the annular clamping region has an angling step such that the clamped-in diaphragm is bent in its outer annular border region. In this way, a sealed tightness is achieved over long time periods, as well as inducing a uniform diaphragm tension which effects performance of the pump advantageously. Inventive valve designs are provided which allow removal for cleaning from outside the assembled pump and also allows manual opening of the valves for unclogging. An efficient design is provided for a pump head.

41 Claims, 5 Drawing Sheets

DIAPHRAGM PUMP CONSTRUCTION

BACKGROUND OF THE INVENTION

Field of the Invention

The invention relates to a diaphragm pump with a hydraulic component, a pump head and a flat diaphragm which is clamped between facing border regions or faces of the hydraulic component and the pump head. The pump head comprises a paint chamber bordering the diaphragm having paint inlet and outlet valves. The hydraulic component comprises a piston or ram oscillating in a direction normal to a plane of the diaphragm and acting on a propulsion fluid which fills a propulsion chamber located between a piston front and the diaphragm. Such diaphragm pumps have been known and have been on the market for a long time.

In the case of these known diaphragm pumps, the diaphragm is clamped between the flat face edges of the pump head and the hydraulic block. It has the disadvantage that when the axial bracing or damping tightness between the pump head and the hydraulic block decreases, the clamped-in diaphragm becomes permeable or by-passable very rapidly and leads to considerable washouts of the flow in one of the two parts of the pump. Although sealing channels integrated in both housing parts are a certain improvement, it is necessary after comparatively short operating times of the pump to take off the pump head in order to either exchange the diaphragm and/or the mentioned border regions of the two pump parts.

SUMMARY OF THE INVENTION

Therefore, it is an object of the present invention to improve a diaphragm pump of the initially mentioned type such that a long lasting tightness of a clamp-in region of the diaphragm is guaranteed and thus, the pump must only be taken apart after considerably longer operating times. The solution of this problem results from the inventive feature that facing edges or faces of the pump head and the hydraulic component are provided with corresponding bends which form a circular step, bending and clamping an outer circular edge of the diaphragm.

Due to the long operating times that can be achieved with the invention without taking apart the pump and thus also without cleaning the paint valves, it is possible that these valves gum up due to certain paints and/or insufficient cleaning. In order to avoid the gumming up of the paint valves, the diaphragm pump must be taken apart often times despite being tight. To solve this disadvantage, the paint valves are fashioned according to expedient embodiments of the invention such that possible clog-ups can be removed from the outside. The valves are designed to be removable from the outside. The inlet and outlet valves have manually activated mechanisms which are accessible from outside the pumps to open up the valves for cleaning such as by forward or reverse flow.

DESCRIPTION OF THE PREFERRED EMBODIMENTS

Figure 1:
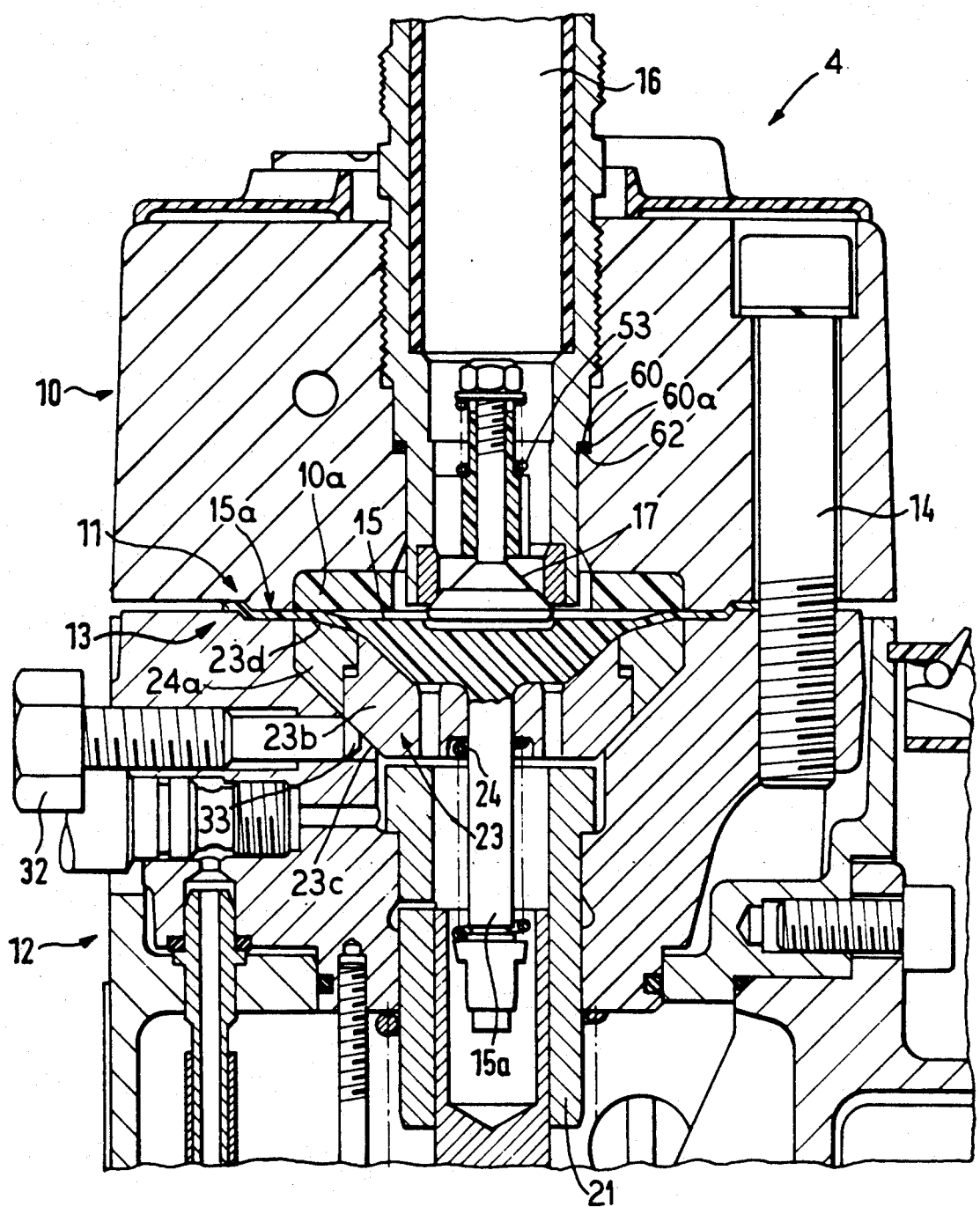
FIG. 1 is a partial section through a diaphragm pump, including a pump head and an adjacent hydraulic component.

According to FIG. 1, a diaphragm pump 4 has a first compartment means such as a pump head 10 with an annular border region 11 and a second compartment means such as a hydraulic block 12 with an annular face 13. The pump head 10 and the hydraulic block 12 are assembled together by means of screws 14, whereby between the pump head 10 and the hydraulic block 12, a diaphragm 15 is inserted whose outer annular periphery or peripheral clamping region 15a is clamped between the annular border region 11 and the annular face 13 as it will be explained later in detail. The pump head 10 is centrally penetrated by an inlet valve 16 whose valve cone 17 is arranged centrally above the diaphragm 15, shown in FIG. 1, such that above the diaphragm 15 a flat paint chamber 18 results.

Figure 2:
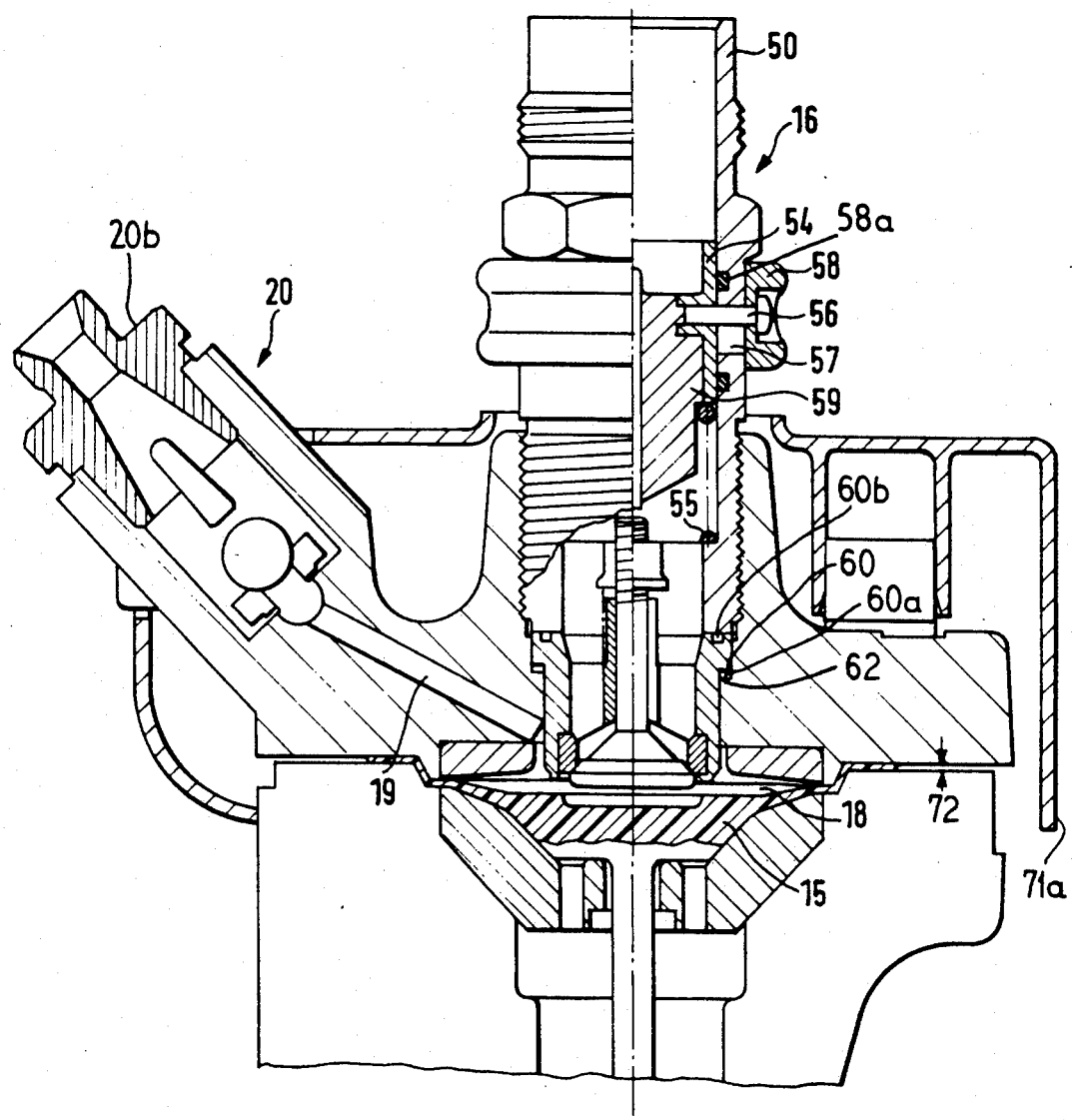
FIG. 2 is a partial section through the diaphragm pump of FIG. 1; however in a plane turned by 90°.

As revealed in FIG. 2, an outlet channel 19 goes out from this paint chamber 18, the outlet channel 19 leading to a paint outlet valve 20 penetrating into the pump head 10. The hydraulic block 12 holds centrally therein a ram or piston 21 which is driven by an eccentric not visible in the drawings. As shown more clearly in FIG. 3, between an upper front face 21a of the piston 21 and a bottom side of the diaphragm 15, a propulsion chamber 22 is fashioned which is filled with hydraulic fluid. A support insert 23 is arranged in the hydraulic block 12, which serves for supporting the diaphragm 15. The support insert 23 has holes 23a to pass propulsion fluid from the propulsion chamber 22 to the diaphragm 15. The diaphragm 15, whose axial prolongation or stem 15a projects through a central boring of the support insert 23, is loaded by a spring 24 such that the diaphragm 15 presses against the support insert 23 given a lack of pressure in the propulsion chamber 22, which diaphragm position is described as bottom dead center or UT.

The above explained basic construction corresponds to the usual diaphragm pumps. In short, the function is such that given a movement stroke of the ram 21 towards the bottom of the hydraulic part, oriented as shown in FIG. 1, during a suction-stroke, the diaphragm 15 also moves towards the bottom due to the spring 24 and lays itself against the support insert 23 at UT, during which the inlet valve 16 opens and paint enters into the paint chamber 18. When the ram 21 moves back toward the top of the hydraulic part, during a pressure-stroke, the propulsion fluid located in the chamber 22 presses the diaphragm 15 toward the pump head 10 so that it eventually presses against the bottom of the pump head 10, which is characterized for the diaphragm as OT or upper dead center, with the consequence that the paint located in the chamber 18 is pressed through the outlet channel 19 and the outlet valve 20 and into a conveyor line (not shown) which can be attached to paint equipment.

Figure 3:
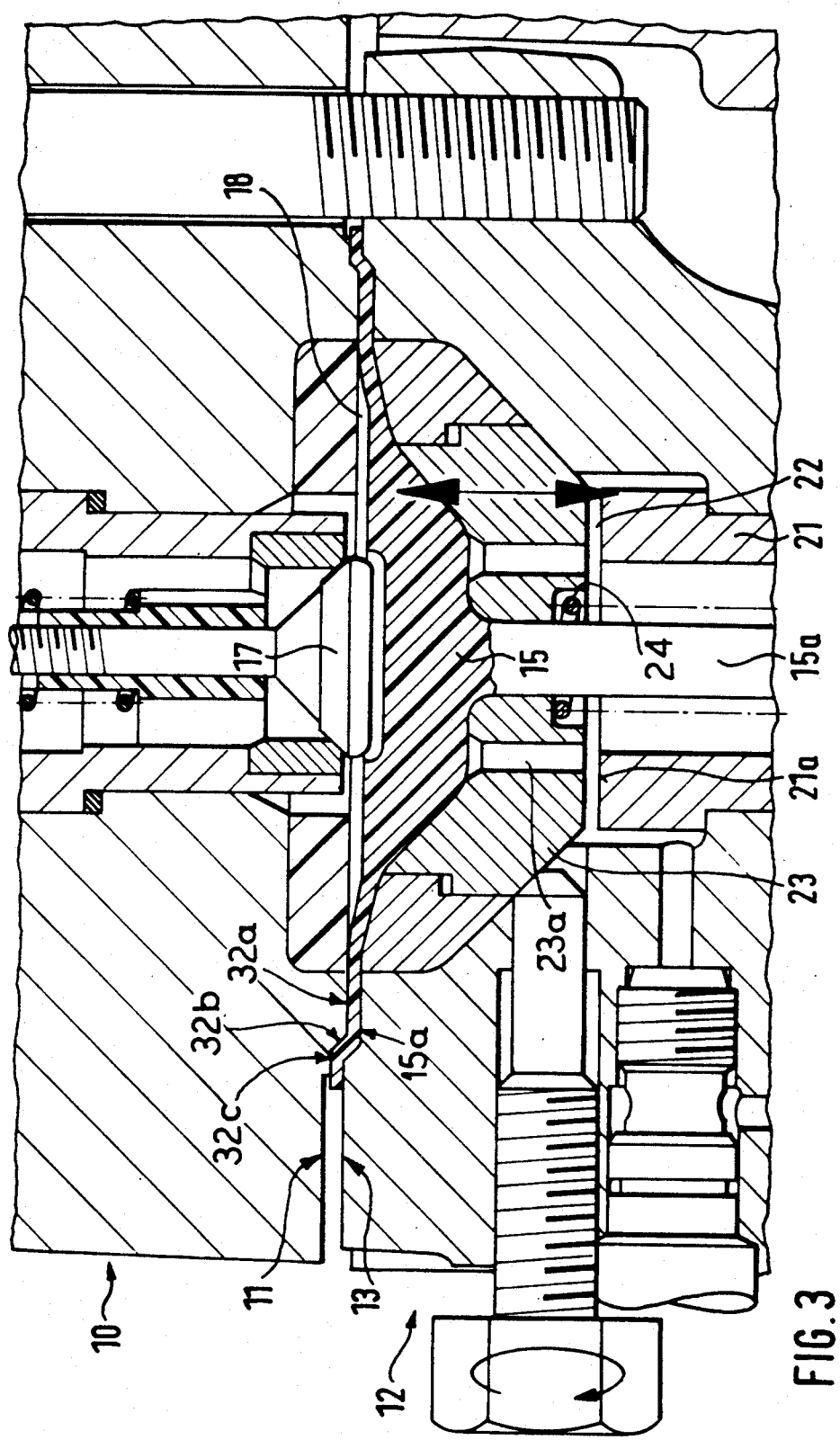
FIG. 3 is an enlarged cutout of FIG. 1.
Figure 4:
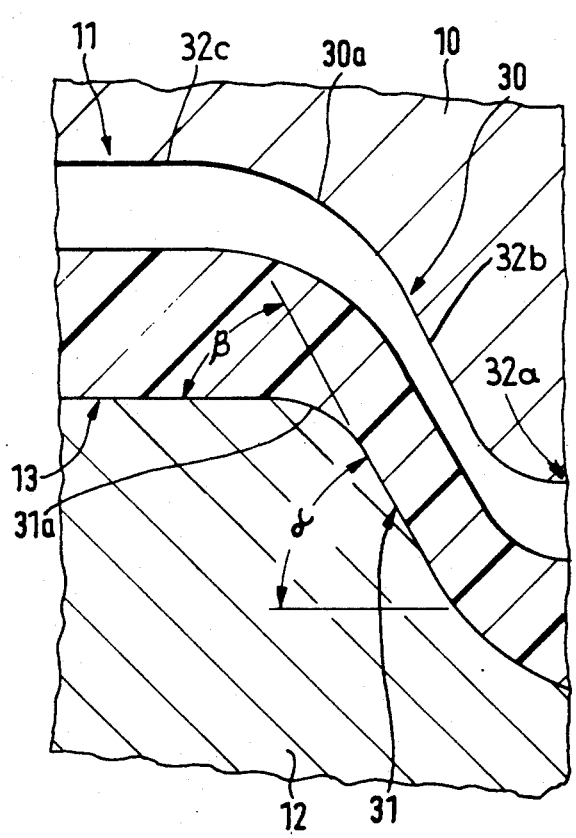
FIG. 4 is a further enlarged cutout of FIG. 3.

As best seen in FIGS. 3 and 4, the annular region 11 and the annular face 13 of the pump head 10 and the hydraulic block 12 respectively, in facing relationship, have a first and second stepped profile 30, 31 respectively which comprise a plurality of contiguous peripheral areas arranged planarly angled as described below. The stepped profiles are fashioned corresponding to each other, i.e., in parallel planar fashion. A step angle α relative to the horizontal line, as oriented in FIG. 4, is to lie between 60° and 80°, preferably at approx. 65°. A step depth can be 2.5 to 3.5 mm. The diaphragm is bent when clamped between these stepping profiles 30, 31.

As seen from the central axis of the diaphragm 15 outwardly in FIGS. 3 and 4, the stepped profile 30, 31 clamping the outer annular periphery 15a of the diaphragm, or clamp-in region, has three possible subregions: first is a first region or a flat clamping region 32a whose length is approx. 3 to 5 mm, then a second region or an angled clamping region 32b and possibly a third region or an outer flat clamping region 32c. The first and second stepped profiles 30, 31 are located at such a place that the outer annular periphery 15a of the diaphragm is seized by the stepped profiles 30, 31, whereby the diaphragm can in fact end at ends 30a, 31a of the angled clamping regions 32b respectfully, without the diaphragm extending into the outer flat region 32c. Due to the bending of the diaphragm 15 in the clamp-in region 15a, a sealing function is achieved that is insensitive to flow or weakening of the screwed forces or clamping forces due to frequent temperature changes, such as frequent switching between an operating condition ON and an operating condition OFF. The number of the possible operating hours of the diaphragm pumps increases without exchanging the diaphragm due to permeability or bypassing or washouts of the annular periphery 15a and without redoing the annular border region 11 or the annular face 13 or replacing the pump head and/or the hydraulic block.

The step angle α is shown as the included acute angle between the angled clamping region 32b and the flat clamping region 32a. In the preferred embodiment, a second included acute angle β between the angled clamping region 32b and the outer flat clamping region 32c, is shown in FIG. 4 to be equal to α, the two flat regions 32a, 32c being substantially planarly parallel. However, this need not be so, the second acute include angle β between the angled clamping region 32b and the outer flat clamping region 32c, being different from α, is encompassed by the invention.

This angled clamping of the diaphragm also influences the suction behavior during the ventilation of the pump, i.e. when the paint chamber 18 is filled with paint for the first time. If the diaphragm 15 has a naturally flat shaped outer annular edge region in the clamping region, and is laid on one of either the annular border region 11 or the annular face 13 of the pump head or the hydraulic block respectively, whereby the diaphragm 15 is pressed by the spring 24 against the support insert 23 determining the UT, and then the respective other one of the annular region 11 or the annular face 13, is applied and the screw coupling between the pump head 10 and the hydraulic block 12 performed, a uniform, ring-shaped tensile stress on the diaphragm 15 is generated due to the bending of the diaphragm in the diaphragm clamp-in region with the consequence that, against the force of the spring 24, the diaphragm 15 is slightly lifted from the support insert 23 toward the top and thus out of its UT. When the operation of the diaphragm pump is started, the diaphragm 15 thus performs its oscillating travel more in an upper stroke region, i.e. in a stroke region which is limited by a point above the UT and the OT or upper dead center. Due to this feature, the paint chamber 18, which is first filled with air, is kept comparatively small which noticeably simplifies the intake of paint, even heavy paint. When the paint chamber 18 is completely filled with paint, whereby a corresponding pressure can build up, the membrane 15 performs its full stroke from the UT to a point shortly before the OT, i.e. the diaphragm movement is now more shifted towards the UT. Simultaneously, the uniform ring-shaped tensile stress prevailing in the diaphragm 15 has an effect on the expulsion of the paint from the outlet valve 20, thus supporting the hydraulic power end so that the pump efficiency is additionally improved particularly when heavy paint is output.

FIG. 4 shows that the pump head 10 and the hydraulic block 12 are fashioned not only so that an undular form of diaphragm clamping is achieved but that the regions 32a, 32b and 32c are dimensioned and shaped so that a distance between the matching stepped profiles 30, 31 in the region 32b is narrower than a distance between pump head 10 and hydraulic block 12 within the regions 32a and 32c. This results in a greater pressing force and a better sealing effect. Additionally, a decrease in clamping pressure caused, for example, by lessening of the screw forces has a far less detrimental effect in the region 32b between stepped profiles 30, 31, because of its angular orientation.

FIG. 1 shows that an adjustment screw 32 is inserted in the hydraulic block 12 in crosswise fashion, having a first end projecting out of the hydraulic block for adjustment, and having a second end engaging the support insert 23. With this adjusting screw 32 the support insert 23 can be manually axially moved toward the top or bottom of FIG. 1, from the outside. This provides the possibility to change the UT position of the diaphragm 15 and to perform an adaptation of the diaphragm-stroke region in a most simple manner in order to thus simplify—corresponding to the above explanations—the filling event and/or to perform an adjustment for the viscosity of the paint to be pumped.

The support insert 23 comprises an outer support ring 23a engaged peripherally by an inner support ring 23b. The inner support ring 23b provides an inclined surface 23c which is abutted by a distal end inclined surface 33 of the adjusting screw 32. By protruding the adjusting screw 32 inwardly, the inner support ring 23a moves toward the diaphragm 15, engaging the outer support ring 23a to clamp progressively the inside peripheral areas of the diaphragm 15 against an annular support plate 10a arranged above the diaphragm 15. Because the outer support ring 23a has an inwardly inclined abutting surface 23d facing the diaphragm 15, translation of the outer support ring 23a toward the diaphragm 15 will thereby clamp progressively larger peripheral annular areas of the diaphragm 15 having progressively smaller central circular openings against the annular support plate 10a. Thus, by adjusting the support insert 23 with the adjusting screw 32 the unclamped span of the diaphragm can be changed and the stroke or tension of the diaphragm 15 can be adjusted.

The above measures allow the diaphragm pump 4 of the invention to be operated for a long time without the necessity to take apart the pump, i.e. to take off the pump head 10, in order to exchange the diaphragm or to change the stroke region of the diaphragm. Another advantage of the invention, however, is that in the case of the known diaphragm pumps, the pump head 10 must be taken off frequently because the paint valves can clog up, for example, by the deposition of solid matter particles contained in the paint, such as metal varnish. Another inventive feature of the invention is that the paint valves can be unclogged without having to remove the pump head 10.

Figure 5:
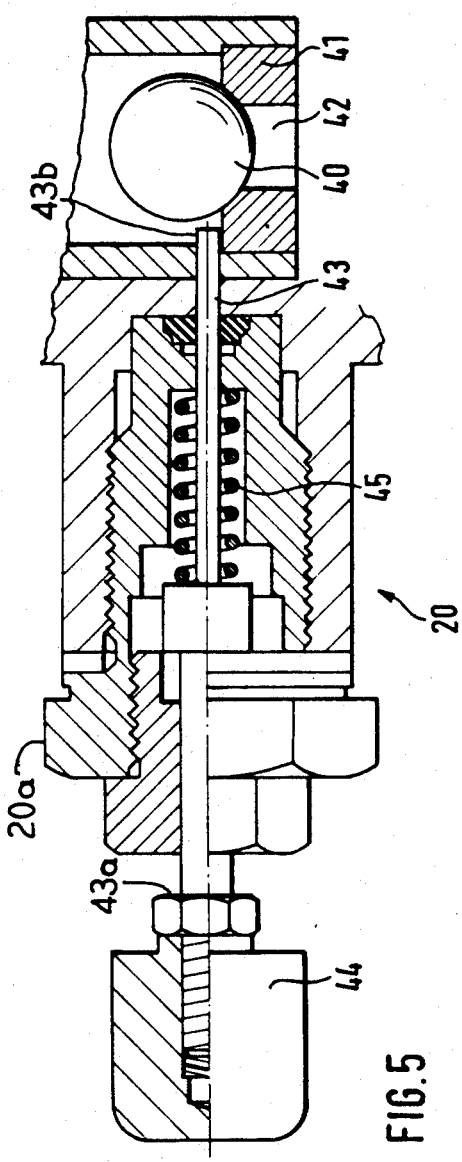
FIG. 5 is a section through one outlet valve.

FIG. 5 shows the paint outlet valve 20 in detail. The valve 20 has a poppet ball 40 which is pressed by a valve spring (not shown) against a valve seat 41. During the pressure stroke of the diaphragm pump the poppet ball 40 is lifted by the paint coming under high pressure at 42 against the force of the valve spring, that is the valve is opened. During the suction stroke of the diaphragm pump the valve spring presses the ball 40 against the valve seat 41, that is, it closes the valve. According to the invention, the outlet valve 20 is provided with a channel or guide in which a valve lifter 43 is carried in sealing fashion. At a remote end 43a, the valve lifter 43 projects out of a valve housing 20a and is there provided with an actuation button 44. The opposite end 43b of the valve lifter is facing the poppet ball 40 whereby the axis of the valve lifter is arranged such that it is tangent with the ball below the transverse axis of the ball, i.e., closer to the valve seat 41. A screw spring 45 surrounding the valve lifter 43 exerts a force on the valve lifter in the direction away from the ball 40. If, however, the button 44 is pressed in, the valve lifter 43 is shifted towards and against the ball 40 against the force of the screw spring 45. Upon further movement of the button 44, the valve lifter 43 lifts the spring-loaded poppet ball 40 from its seat 41, whereby possibly existing clog-ups can be loosened physically or by forward or backward flow through the valve. This design of the outlet valve 20 thereby has the advantage that easy access to the valve lifter 43 exists outside of a flow region. Also, FIG. 2 shows that the ball 40 can be removed for cleaning from the outside by removing a nozzle portion 20b of the outlet valve 20.

Figure 6A:
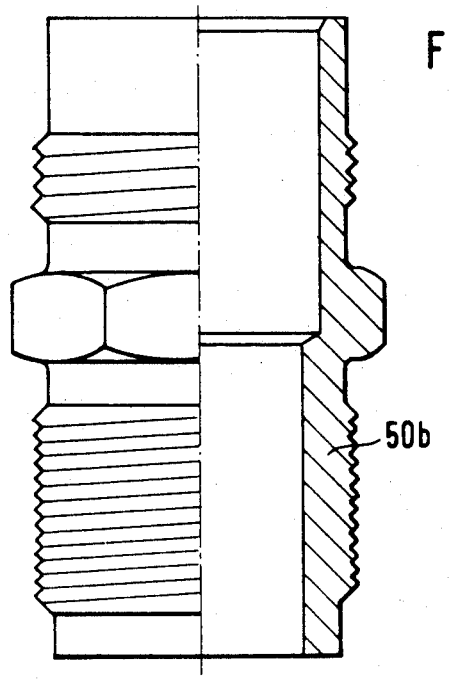
FIGS. 6A and 6B, are sections through a two-piece inlet valve.
Figure 6B:
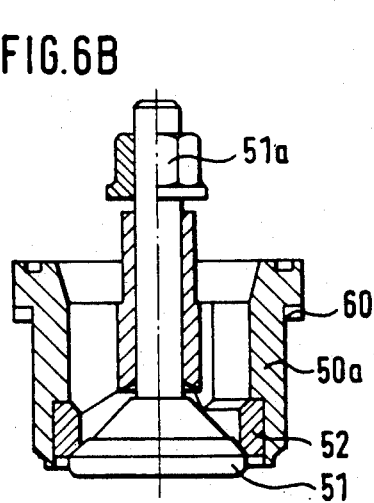

FIGS. 2, 6A and 6B show a construction of the inlet valve 16. This inlet valve 16 has a cylindrical housing composed of a bottom housing part 50a and a upper housing part 50b. The bottom housing part 50a accommodates a valve poppet 51 with a valve shaft 51a, a valve seat 52 and a valve spring 53 stressing the valve poppet 51 against the valve seat 52. The valve spring 53 is shown in its proper orientation in FIG. 1. In the upper housing part 50b, an axially displaceable sleeve 54 is located which is biased by a sleeve spring 55 in the direction toward the top. The sleeve 54 has a pin 56 projecting from its circumference towards the outside, this pin going through a longitudinal cut or slot 57 of the housing part 50b and fastened at a sliding ring 58, which sits on the housing part 50b in slidable fashion. Finally, the sleeve 54 has a fin or rib 59 projecting towards the inside whose free end is located above the uper end of the valve shaft 51a. In the condition shown in FIG. 2, the rib 59, does not influence the function of the valve. If, however, the ring 58 is pressed downward in a sliding fashion, the ring 58 moves the sleeve 54 via the pin 56, against the force of the sleeve spring 55, towards the bottom, so that the rib 59 hits the upper end of the valve shaft 51a, moving the shaft downward and opening the valve 16. As soon as the ring 58 is released, the valve can close again with the sleeve 54 returning to its natural position. A sealing ring or gasket 58a is provided to prevent paint leakage or dripping out of the slot 57.

The insertion of the inlet valve 16 into the pump head ensures in the manner that first the bottom housing part 50a, containing the valve seat 52, and the valve poppet 51, the valve shaft 51a, and the valve spring 53 in assembled fashion are inserted into a corresponding boring of the pump head whereby a shoulder 60 of the housing part 50a presses against a corresponding shoulder 62 of the pump head boring. Thereupon the upper housing part 50b of the inlet valve 16 provided with the above described sliding ring 58 and cooperating parts is screwed by means of threads into the boring of the pump head, the upper housing part 50b having fashioned thereon an integral nut around its upper end, until it reaches with its front face area the bottom housing part 50a and braces it against the pump head, the shoulder 60 against the corresponding shoulder 62. A sealing between the shoulders 60, 62 ensues via a first sealing ring 60a. A sealing between the bottom housing part 50a and the upper housing part 50b ensues via a second sealing ring 60b. The advantage of such a two-piece embodiment of the inlet valve 16 is that in the case of repairs or replacement parts the costs can be kept low given an easy handling and assembly. A replacement bottom housing part 50a can be more inexpensively replaced than an entire valve comprising both upper and lower housing parts 50a, 50b.

Figure 7:
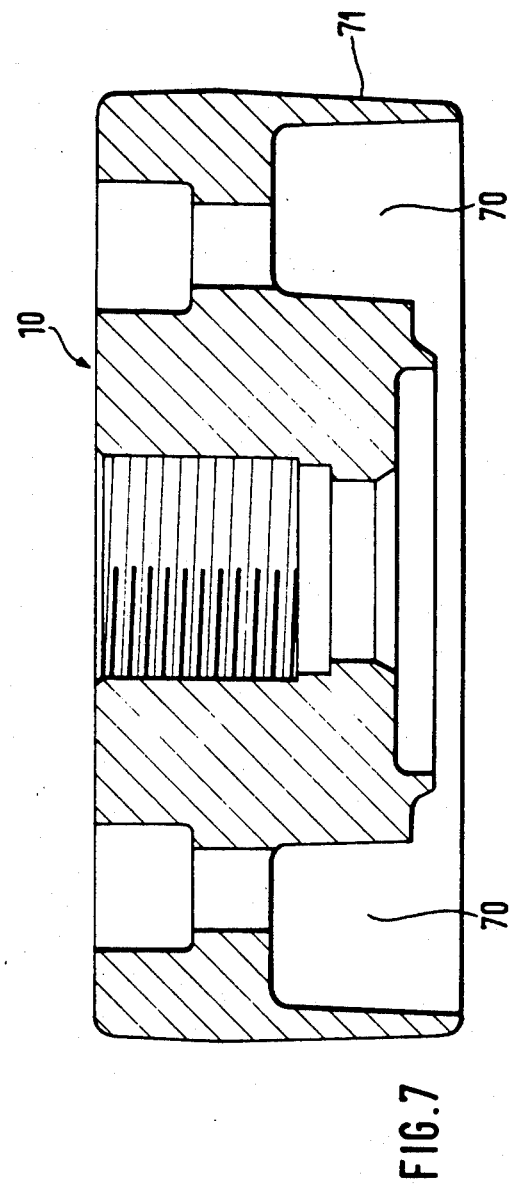
FIG. 7 is a section through another embodiment of the pump head.

Based on the already described features of the invention, long operating times can be achieved without taking off the pump head 10 and cleaning it. Without regular cleaning such long operating time may increase the risk of a corrosion of the pump head, which is nowadays generally manufactured from light metal, particularly when very aggressive paints are used. Acccording to a further embodiment of the invention, the pump head 10 is therefore manufactured from steel, however, as revealed by FIG.7, provided with recesses 70. In other words, material is only provided where it is necessary for function in order to be able to maintain a weight which is comparable to the conventional light metal pump heads. Expediently, the recesses 70 are located in the interior of the pump head, whereas the outside of the pump head is to remain flat.

Expediently, the outer edge of the pump head 10 is extended in apron-like fashion, whereby this apron 71 reaches over the hydraulic block 12 when the pump head 10 is connected with the hydraulic block 12, as shown in FIG. 2 with respect to a similar plate apron 71a, whereby a clamp-in gap 72 caused by a thickness of the diaphragm 15, is covered and the penetration of dirt therein prevented. Moreover, the annular step 30 of the pump head 10 is shielded from mechanical damaging particularly during manufacturing and transport. Naturally, the hydraulic block 12 can be provided with a protective-apron as well, similar to the apron 71, 71a whereby both aprons then concentrically overlap each other or one of the two aprons has an engagement groove for the other apron.

As is apparent from the foregoing specification, the invention is susceptible of being embodied with various alterations and modifications which may differ particularly from those that have been described in the preceding specification and description. It should be understood that I wish to embody within the scope of the patent warranted hereon all such modifications as reasonably and properly come within the scope of my contribution to the art.

We claim:

1. A diaphragm pump comprising:
   a first compartment means for receiving a first liquid therein and directing said first liquid thereout, said first compartment means having a first surface;

a second compartment means for holding a second liquid therein, said second compartment means having means for exerting a pressure force on said second liquid, said second compartment means comprising a second surface;

said first compartment means mounted to said second compartment means with said first surface facing said second surface; and a diaphragm located between said first compartment means and said second compartment means, said diaphragm receiving a pressure force from said second liquid and transferring said pressure force across said diaphragm upon said first liquid to cause expulsion of said first liquid from said first compartment means;

wherein said first surface and said second surface each provide a first peripheral region and a second peripheral region, said second peripheral region adjoining and contiguous with said first peripheral region and surrounding said first peripheral region, said second peripheral region angled off in profile from said first peripheral region at a first oblique angle defined as the included acute angle between said first peripheral region and said second peripheral region, said first peripheral regions opposing each other and said second peripheral regions opposing each other, said first peripheral regions and said second peripheral regions cooperating to clamp a peripheral clamping region of said diaphragm residing therebetween, said peripheral clamping region conforming to a shape defined between said opposing first peripheral regions and said opposing second peripheral regions when said first compartment means is mounted to said second compartment means; and an assembled thickness measured between said first peripheral regions of said first and second surfaces is greater than a thickness measured between said second peripheral regions of said first and second surfaces.

2. A diaphragm pump according to claim 1, wherein said first and second peripheral regions of said first surface and said first and second peripheral regions of said second surface are of a same shape, and are planarly parallel.

3. A diaphragm pump according to claim 2, wherein said first oblique angle comprises a measurement of 60° to 80°.

4. A diaphragm pump according to claim 3, wherein said first peripheral region comprises a width, measured in a radial direction from a center of said diaphragm, of 3 to 5 mm, and said second peripheral region has a step depth of 2.5 to 3.5 mm measured normal to said first peripheral region.

5. A diaphragm pump according to claim 4, wherein said first oblique angle comprises a measurement of between 65° to 70°.

6. A diaphragm pump according to claim 2, wherein said peripheral clamping region of said diaphragm ends at an end of said second peripheral region.

7. A diaphragm pump according to claim 2, wherein said first surface and said second surface each, in parallel planar fashion, further comprise: a third peripheral region adjoining said second peripheral region and surrounding said second peripheral region, said third peripheral region arranged, in profile, at a second oblique angle to said second peripheral region, said second oblique angle defined as an included acute angle between said third peripheral region and said second peripheral region.

8. A diaphragm pump according to claim 7, wherein said second oblique angle comprises a measurement of 60°-80°.

9. A diaphragm pump according to claim 8, wherein said first and second oblique angles are equal.

10. A diaphragm pump according to claim 2, wherein said first oblique angle comprises a measurement of between 65°-70°.

11. A diaphragm pump according to claim 2, wherein said first peripheral region comprises a width measured in radial direction from a center of said diaphragm, of 3-5 mm, and said second peripheral region has a step depth of 2.5-3.5 mm measured normal to said first peripheral region.

12. A diaphragm pump according to claim 1, wherein said first compartment means comprises: a pump head having a chamber bordering said diaphragm, an inlet valve feeding said first liquid into said chamber, and an outlet valve providing a liquid exit from said chamber; and said second compartment means comprises a hydraulic block having a piston oscillating therein compressing said second liquid to create said pressure force.

13. A diaphragm pump according to claim 12, wherein said piston oscillates in a direction normal to a plane of said diaphragm; and said hydraulic block further comprises a second chamber located between said piston and said diaphragm filled with said second liquid to be pressed by said piston, and a support insert providing a travel stop of said diaphragm when said piston is moving in a direction away from said diaphragm causing a hydraulic force upon said diaphragm toward said piston.

14. A diaphragm pump according to claim 13, wherein said hydraulic block further comprises a diaphragm spring means for exerting a force on said diaphragm to bias said diaphragm toward said support insert.

15. A diaphragm pump according to claim 12, wherein said outlet valve further comprises a mechanical means for manually opening said outlet valve.

16. A diaphragm pump according to claim 15, wherein said outlet valve comprises a poppet ball covering a valve seat, both ball and seat within a housing of said outlet valve, said poppet ball liftable off said valve seat by fluid pressure from said first liquid, and said mechanical means comprises a spring-loaded valve lifter having a first end facing said poppet ball, said valve lifter protruding through said housing of said outlet valve to an outside of said pump, and terminating in a second end engageable by a user, said valve lifter biased toward non-interference with said poppet ball, force on said second end by the user projects said valve lifter inwardly to engage said poppet ball and further movement lifts said poppet ball off said valve seat.

17. A diaphragm pump according to claim 12, wherein said inlet valve further comprises a mechanical means for manually opening said inlet valve.

18. A diaphragm pump according to claim 12, wherein said outlet valve and said inlet valve have valve poppets that can be removed from said pump head in a disassembleable fashion from an outside of said pump, without need to separate said first compartment means from said second compartment means.

19. A diaphragm pump according to claim 1, wherein said first compartment means comprises a circumferential apron which, when said first compartment means is mounted to said second compartment means, protects a gap, caused by thickness of said diaphragm interposed betweeen said first compartment means and said second compartment means, from collecting foreign materials therein.

20. A diaphragm pump according to claim 1, wherein said compartment comprises
an inlet valve and an outlet valve, at least one of said inlet valve and said outlet valve having a slidable manually push activated mechanical means for forcing open said one valve for flow through cleaning.

21. A diaphragm pump according to claim 20, wherein said outlet valve comprises a poppet ball covering a valve seat, both ball and seat within a housing of said outlet valve, said poppet ball liftable off said valve seat by fluid pressure from said first liquid, and said mechanical means comprises a spring-loaded valve lifter having a first end facing said poppet ball, said valve lifter protruding through said housing of said outlet valve to an outside of said pump, and terminating in a second end engageable by a user, said valve lifter biased toward non-interference with said poppet ball, force on said second end by the user projects said valve lifter inwardly to engage said poppet ball and further movement lifts said poppet ball off said valve seat.

22. A diaphragm pump according to claim 1 further comprising a support insert arranged on one side of said diaphragm and providing an annular clamping surface facing said diaphragm inside said peripheral clamping region of said diaphragm; and
an adjustment secrew proceeding inwardly from said second compartment means to engage with said support insert, insertion of said adjustment screw against said support insert moves said support insert toward said diaphragm to progressively clamp wider annular peripheral areas of said diaphragm, inwardly from said peripheral clamping region of said diaphragm, against the first surface.

23. A diaphragm pump according to claim 22, wherein said peripheral clamping region of said diaphragm ends at an end of said second peripheral region.

24. A diaphragm pump comprising:
a first compartment means for receiving a first liquid therein and directing said first liquid thereout, said first compartment means having a first surface having a first stepped profile;
a second compartment means for holding a second liquid therein, said second compartment means having a hydraulic block having a piston oscillating therein compressing said second liquid to create a pressure force on said second liquid, said second compartment means comprising a second surface having a second stepped profile;
said first compartment means mounted to said second compartment means with said first surface aligned with and facing said second surface; and
a diaphragm located between said first compartment means and said second compartment means, said diaphragm receiving a pressure force from said second liquid and transferring said pressure force across said diaphragm upon said first liquid to cause expulsion of said first liquid from said first compartment means, said first stepped profile and said second stepped profile cooperating to bend a peripheral clamping region of said diaphragm residing therebetween, said peripheral clamping region conforming to a shape defined between said first and second stepped profiles when said first compartment means is mounted to said second compartment means;
wherein said first compartment means provides a pump head having a chamber bordering said diaphragm, and inlet valve feeding said first liquid into said chamber, and an outlet valve providing a liquid exit from said chamber;
wherein said piston oscillates in a direction normal to a plane of said diaphragm;
wherein said hydraulic block provides a second chamber located between said piston and said diaphragm filled with said second liquid to be pressed by said piston, and a support insert providing a travel stop of said diaphragm when said piston is moving in a direction away from said diaphragm causing a hydraulic force upon said diaphragm toward said piston; and
wherein said second compartment means further comprises a support insert adjustment means for selectively locating said support insert a desired distance from said diaphragm, selectively limiting movement of said diaphragm toward said piston when said piston is moving in a direction away from said diaphragm.

25. A diaphragm pump according to claim 24, wherein said support insert adjustment means comprises an adjusting screw threaded into said hydraulic block with a manual engagement means residing outside of said hydraulic block and with an engagement end extending into said hydraulic block and engaging said support insert, advancement of said adjusting screw into said hydraulic block moving said support insert toward said diaphragm.

26. A diaphragm pump according to claim 25, wherein said support insert comprises a ramped surface abutting said engagement end of said adjusting screw, advancement of said engagement end of said adjusting screw causing said ramped surface to slide over said engagement end, and said support insert to translate toward said diaphragm.

27. A diaphragm pump comprising:
a first compartment means for receiving a first liquid therein and directing said first liquid thereout, said first compartment means having a first surface having a first stepped profile;
a second compartment means for holding a second liquid therein, said second compartment means having a hydraulic block having a piston oscillating therein compressing said second liquid to create a pressure force on said second liquid, said second compartment means comprising a second surface having a second stepped profile;
said first compartment means mounted to said second compartment means with said first surface aligned with and facing said second surface; and
a diaphragm located between said first compartment means and said second compartment means, said diaphragm receiving a pressure force from said second liquid and transferring said pressure force across said diaphragm upon said first liquid to cause expulsion of said first liquid from said first compartment means, said first stepped profile and said second stepped profile cooperating to bend a peripheral region of said diaphragm residing therebetween, said peripheral region conforming to a shape defined between said first and second stepped profiles when said first compartment means is mounted to said second compartment means;

wherein said first compartment means provides a pump head having a chamber bordering said diaphragm, and inlet valve feeding said first liquid into said chamber, and an outlet valve providing a liquid exit from said chamber; and wherein said inlet valve comprises a cylindrical housing penetrating said pump head, said cylindrical housing having a valve seat inside said pump head, said inlet valve having a valve head closable to said seat to close said valve, said valve head mounted to a shaft arranged axially inside said cylindrical housing, said cylindrical housing having a slot therethrough in a portion of said cylindrical housing located accessible to an outside of said pump, and said inlet valve provides a mechanical means for manually opening said inlet valve having a fin residing interior of said cylindrical housing above said shaft, and a handle located outside of said cylindrical housing, said handle fastened to said fin through said slot, said slot sized to allow sliding movement of said handle and said fin toward and away from said shaft, sliding movement of said fin toward said shaft, and once abutting said shaft, further movement causes said valve head to be displaced from said seat which opens said inlet valve.

28. A diaphragm pump according to claim 27, wherein said mechanical means further comprises a cylindrical sleeve arranged coaxially inside said cylindrical housing, having said fin mounted thereto on an inside of said cylindrical sleeve, and said handle is fixed to said cylindrical sleeve, through said slot, by a fastener.

29. A diaphragm pump according to claim 28, wherein said fin is biased away from said shaft by a spring exerting force upon said cylindrical sleeve.

30. A diaphragm pump according to claim 27, wherein said pump head further comprises a bore for receiving said inlet valve and a cooperating shoulder inside said bore; and wherein said cylindrical housing comprises a first housing part and a second housing part, said first housing part comprising a cylinder with said valve seat on a first end, an annular end surface at a second end, and an annular shoulder therebetween, said first housing part inserted into said bore; and said second housing part abuttingly engageable with said second end of said first housing part, said second housing part comprising a threaded cylinder portion, said threads engageable by threads in said bore, said second housing part following said first housing part into said bore, said second housing part having said fin residing therein and having said slot formed therethrough for attachment with said handle, and said second housing part abutting said first housing part onto said annular end surface in a pressing and sealing fashion when said second housing part is screwed into said pump head, said second housing part causing a pressing force of said annular shoulder onto said cooperating shoulder portion of said pump head, causing a second seal to the formed therebetween.

31. A diaphragm pump comprising: a first compartment means for receiving a first liquid therein and directing said first liquid thereout, said first compartment means having a first surface having a first stepped profile;

a second compartment means for holding a second liquid therein, said second compartment means having a hydraulic block having a piston oscillating therein compressing said second liquid to create a pressure force on said second liquid, said second compartment means comprising a second surface having a second stepped profile;

said first compartment means mounted to said second compartment means with said first surface aligned with and facing said second surface; and a diaphragm located between said first compartment means and said second compartment means, said diaphragm receiving a pressure force from said second liquid and transferring said pressure force across said diaphragm upon said first liquid to cause expulsion of said first liquid from said first compartment means, said first stepped profile and said second stepped profile cooperating to bend a peripheral clamping region of said diaphragm residing therebetween, said peripheral clamping region conforming to a shape defined between said first and second stepped profiles when said first compartment means is mounted to said second compartment means;

wherein said first compartment means provides a pump head having a chamber bordering said diaphragm, an inlet valve feeding said first liquid into said chamber, and an outlet valve providing a liquid exit from said chamber; and wherein said pump head provides a threaded bore having an abutment therein for receiving said inlet valve; and said inlet valve provides a first housing part holding a valve seat covered by a valve poppet, said first housing part inserted into said bore, and a second housing part threadingly inserted into said bore following said first housing part, abutting a trailing end of said first housing part and pressing said first housing part to said abutment to capture said first housing part inside said bore.

32. A diaphragm pump comprising:
a first compartment means for receiving a liquid therein and directing said liquid thereout, said compartment means comprising an inlet valve and an outlet valve, at least one of said inlet valve and said outlet valve having manually activated mechanical means for forcing open said one valve;

a diaphragm means for exerting a reciprocating pressing force upon said liquid to cause expulsion of said liquid from said compartment means;

wherein said inlet valve provides a cylindrical housing, said cylindrical housing having a valve seat and a valve head closable to said seat to close said valve, said valve head mounted to a shaft arranged axially inside said cylindrical housing, said cylindrical housing having a slot therethrough; and said mechanical means comprises a fin residing interior of said cylindrical housing above said shaft, and a handle located outside of said cylindrical housing at an accessible location for manual actuation, said handle fastened to said fin through said slot, said slot sized to allow sliding movement of said handle and said fin toward and away from said shaft, sliding movement of said fin toward said shaft, and once abutting said shaft further movement causes said valve head to be displaced from said seat which opens said inlet valve.

33. A diaphragm pump according to claim 32, wherein said mechanical means further comprises a cylindrical sleeve arranged coaxially inside said cylindrical housing, having said fin mounted to said cylindrical sleeve on an inside of said cylindrical sleeve, and said handle is fixed to said cylindrical sleeve, through said slot, by a fastener.

34. A diaphragm pump according to claim 32, wherein said compartment means further comprises a pump head forming a containment of said liquid and said pump head comprises: a bore for receiving said inlet valve, and a cooperating shoulder inside said bore; and wherein said cylindrical housing comprises a first housing part and a second housing part, said first housing part comprising a cylinder with said valve seat on a first end, an annular end surface at a second end, and an annular shoulder therebetween, said first housing part inserted into said bore; and said second housing part abuttingly engageable with said second end of said first housing part, said second housing part comprising a threaded cylinder portion, said threads engageable by threads in said bore, said second housing part following said first housing part into said bore, said second housing part having said fin residing therein and having said slot formed therethrough for attachment with said handle, and said second housing part abutting said first housing part onto said annular end surface in a pressing and sealing fashion when said second housing part is screwed into said pump head, said second housing part causing a pressing force of said annular shoulder onto said cooperating shoulder portion of said pump head, causing a second seal to be formed therebetween.

35. A diaphragm pump according to claim 32, wherein said compartment means further comprises a pump head for containment of said liquid, and said pump head comprises a threaded bore having an abutment therein for receiving said inlet valve; and said inlet valve comprises: a first housing part holding a valve seat covered by a valve poppet, said first housing part inserted into said bore, and a second housing part threadingly inserted into said bore following said first housing part, abutting a trailing end of said first housing part and pressing said first housing part to said abutment to capture said first housing part inside said bore.

36. A diaphragm pump according to claim 32, wherein said outlet valve and said inlet valve have valve heads that can be removed from said compartment means in a disassembleable fashion from an outside of said pump, without need to separate said first compartment means from said diaphragm means.

37. A diaphragm pump comprising:
a first compartment means, for receiving a first liquid therein and directing said first liquid thereout, said first compartment means comprising a first opening, an inlet valve and an outlet valve;
a second compartment means, for holding a second liquid therein, having a second opening, and having means therein for exerting a pressing force on said second liquid to increase a pressure of said second liquid, said second compartment means comprising a support insert;
a diaphragm located between said first compartment means and said second compartment means, said diaphragm receiving a pressure force from said second liquid, through said second opening, to exert a pressing force through said diaphragm upon said first liquid, through said first opening, to cause expulsion of said first liquid from said first compartment means, and said support insert is mounted on a side of said diaphragm opposite a side facing said first opening, said support insert providing a travel stop of said diaphragm by abutting said diaphragm when said diaphragm moves in a direction opposite of the direction of pressing of said liquid, and toward said support insert, said support insert having an adjustment means for selectively locating said support insert a desired distance from said diaphragm, selectively limiting movement of said diaphragm; and
a means for mounting said first compartment means to said second compartment means.

38. A diagram pump according to claim 37, wherein said first compartment means comprises a pump head for containing said first liquid and having a chamber bordering said diaphragm, and an inlet valve feeding said first liquid into said chamber, and an outlet valve providing a liquid exit from said chamber; and
said second compartment means comprises a hydraulic block for containing said second liquid and having a piston oscillating therein compressing said second liquid to create said pressure force.

39. A diaphragm pump according to claim 38, wherein said piston oscillates in a direction normal to a plane of said diaphragm; and said hydraulic block further comprises a second chamber located between said piston and said diaphragm filled with said second liquid to be pressed by said piston, and said support insert provides a travel stop of said diaphragm when said piston is moving in a direction away from said diaphragm causing a hydraulic force upon said diaphragm toward said piston.

40. A diaphragm pump comprising:
a first compartment means, for receiving a first liquid therein and directing said first liquid thereout, said first compartment means comprising a first opening, an inlet valve and an outlet valve;
a second compartment means, for holding a second liquid therein, having a second opening, and having a hydrualic block for containing said second liquid and having a piston oscillating therein compressing said second liquid to create a pressing force on said second liquid to increase a pressure of said second liquid, said second compartment means comprising a support insert;
a diaphragm located between said first compartment means and said second compartment means, said diaphragm receiving a pressure force from said second liquid, through said second opening, to exert a pressing force through said diaphragm upon said first liquid, through said first opening, to cause expulsion of said first liquid from said first compartment means, and said support insert is mounted on a side of said diaphragm opposite a side facing said first opening, said support insert providing a travel stop of said diaphragm by abutting said diaphragm when said diaphragm moves in a direction opposite of the direction of pressing of said liquid, and toward said support insert, said support insert having an adjustment means for selectively locating said support insert a desired distance from said diaphragm, selectively limiting movement of said diaphragm; and a means for mounting said first compartment means to said second compartment means;

wherein said first compartment means comprises a pump head for containing said first liquid and having a chamber bordering said diaphragm, and an inlet valve feeding said first liquid into said chamber, and an outlet valve providing a liquid exit from said chamber; and wherein said piston oscillates in a direction normal to a plane of said diaphragm; and wherein said hydraulic block further comprises a second chamber located between said piston and said diaphragm filled with said second liquid to be pressed by said piston, and said support insert provides a travel stop of said diaphragm when said piston is moving in a direction away from said diaphragm causing a hydraulic force upon said diaphragm toward said piston; and wherein said support insert adjustment means comprises an adjusting screw threaded into said hydraulic block with a manual engagement means residing outside of said hydraulic block and with an engagement end extending into said hydraulic block and engaging said support insert, advancement of said adjusting screw into said hydraulic block moves said support insert toward said diaphragm.

41. A diaphragm pump according to claim 40, wherein said support insert comprises a ramped surface abutting said engagement end of said adjusting screw, advancement of said engagement end of said adjusting screw causing said ramped surface to slide over said engagement end, and said support insert to translate toward said diaphragm.

* * * * *